United States Patent [19]
Martinsky

[11] Patent Number: 6,101,946
[45] Date of Patent: Aug. 15, 2000

[54] MICROARRAY PRINTING DEVICE INCLUDING PRINTING PINS WITH FLAT TIPS AND EXTERIOR CHANNEL AND METHOD OF MANUFACTURE

[75] Inventor: Richard S Martinsky, San Jose, Calif.

[73] Assignee: TeleChem International Inc., Sunnyvale, Calif.

[21] Appl. No.: 09/191,935

[22] Filed: Nov. 13, 1998

Related U.S. Application Data

[60] Provisional application No. 60/066,733, Nov. 21, 1997.

[51] Int. Cl.$^7$ ...................................................... B01L 3/02
[52] U.S. Cl. ..................... 101/494; 435/283.1; 422/100; 422/920; 422/50; 222/420
[58] Field of Search ...................... 101/494; 400/118.2; 422/50, 920, 100; 435/283.1; 222/420

[56] References Cited

U.S. PATENT DOCUMENTS

| | | | |
|---|---|---|---|
| 4,020,698 | 5/1977 | D'Autry | 73/864.18 |
| 4,827,780 | 5/1989 | Sarrine et al. | 422/102 |
| 4,981,783 | 1/1991 | Augenlicht | 435/6 |
| 5,143,854 | 9/1992 | Pirrung | 436/518 |
| 5,384,261 | 1/1995 | Winkler | 436/518 |
| 5,436,327 | 7/1995 | Southern | 536/25.34 |
| 5,474,796 | 12/1995 | Brennan | 427/2.13 |
| 5,525,464 | 6/1996 | Drmanac et al. | 435/6 |
| 5,658,802 | 8/1997 | Hayes et al. | 436/518 |
| 5,709,668 | 1/1998 | Wacks | 604/232 |
| 5,741,554 | 4/1998 | Tisone | 427/424 |
| 5,744,305 | 4/1998 | Fodor et al. | 435/6 |
| 5,770,151 | 6/1998 | Roach et al. | 422/63 |
| 5,770,367 | 6/1998 | Southern et al. | 435/6 |
| 5,800,992 | 9/1998 | Fodor et al. | 435/6 |
| 5,807,522 | 9/1998 | Brown et al. | 422/50 |

OTHER PUBLICATIONS

Blanchard, A.P., Kaiser, R.J. and Hood, L.E. (1996), "high-density oligonucleoyide arrays", *Biosens. Bioelectron.* 11, 687–690.

Chee, M., Yang, R., Hubbell, E., Berno, A., Huang, X. C., Stern, D., Winkler, J., Lockhart, D. J., Morris, M. S., Fodor, S. P. A. (1996) Accessing genetic information with high-density DNA arrays, Science 274: 610–614.

Chu, S., DeRisi, J., Eisen, M., Mulholland, J., Botstein, D., Brown, P.O., Herskowitz, I. (1998). The transcriptional program of sporulation in budding yeasts. Science 282, 699–705.

Cronin, M. T., Fucini, R. V., Kim, S. M., Masino, R. S., Wespi, R. M., Miyada, C. G. (1996) Cystic Fibrosis Mutation Detection by Hybridization to Light–Generated DNA Probe Arrays. Human Mutation 7: 244–255.

(List continued on next page.)

*Primary Examiner*—John S. Hilten
*Assistant Examiner*—Dan Colilla
*Attorney, Agent, or Firm*—Skjerven, Morrill, MacPherson, Franklin and Friel

[57] ABSTRACT

The invention herein describes a device for fabricating microarrays of biochemical substances, consisting of a holder and one or more printing pins. The holder contains apertures with regular spacing that define the location of one or more printing pins during the printing process. The tip of each printing pin contains a sample channel that holds a predetermined volume of biological or chemical sample and a point that is machined to precision with an electronic discharge machine (EDM). The device can be attached to a motion control system for precise and automated movement in three dimensions. The flat tips of the pins are immersed in a biochemical sample such that a predefined volume of sample fills the sample channel of each pin. The holder and pins are then moved in proximity to a printing substrate whereby direct contact between the flat tips of the pins and the surface results in the transfer of a small amount of the sample onto the solid surface. The holder and pins are mass produced at high precision to ensure that the printed elements in the resultant microarray contains approximately the same quantity of sample. In one preferred embodiment, the device is employed to manufacture arrays of nucleic acids or derivatives thereof.

10 Claims, 9 Drawing Sheets

OTHER PUBLICATIONS

DeRisi, J, Penland, L, Brown, P O, Bittner, M L, Meltzer, P S, Ray, M, Chen, Y, Su, Y A, Trent J M (1996) Use of a cDNA microarray to analyze gene expression patterns in human cancer. Nat Genet 14: 457–460.

DeRisi, J. L., Iyer, V. R., Brown P. O. (1997) Exploring the metabolic and genetic control of gene expression on a genomic scale. Science 278: 680–686.

de Saizieu, A., Certa, U., Warrington, J., Gray, C., Keck, W., and Mous, J. (1998) Bacterial transcript imaging by hybridization of total RNA to oligonucleotide arrays. Nature Biotech. 16: 45–48.

Drmanac, S., Kita, D., Labat, I., Hauser, B., Schmidt, C., Burczak, J.D., Drmanac, R. (1998) Accurate sequencing by hybridization for DNA diagnostics and individual genomics. Nature Biotech. 16, 54–58.

Fodor, S. P. A., Read, J. L., Pirrung, M. C., Stryer, L., Tsai Lu, A., Solas, D. (1991) Light–directed, spatially addressable parallel chemical synthesis. Science 251: 767–773.

Hacia, J. G., Brody, L. C., Chee, M. S., Fodor, S. P. A., Collins, F. S. (1996) Detection of heterozygous mutations in BRCA1 using high density oligonucleotide arrays and two––colour fluorescence analysis. Nature Genet. 14: 441–447.

Heller, R. A., Schena, M., Chai, A., Shalon, D., Bedilion, T., Gilmore, J., Woolley, D. E., Davis, R. W. (1997) Discovery and analysis of inflammatory disease–related genes using cDNA microarrays. Proc Natl Acad Sci USA. 94: 2150–2155.

Khrapko, K.R., Khorlin, A.A., Ivanov, I.B., Chernov, B.K., Lysov, Yu.P., Vasilenko, S.K., Florent'ev, V.L., Mirzabekov, A.D. (1991) Hybridization of DNA with oligonucleotides immobilized in gel: a convenient method for detecting single base substitutions. Molecular Biology 25: 581–591.

Kozal, M. J., Shah, N., Shen, N., Yang, R., Fucini, R., Merigan, T. C., Richman, D. D., Morris, D., Hubbell, E., Chee, M., Gingeras, T. R. (1996) Extensive polymorphisms observed in HIV–1 clade B protease gene using high–density oligonucleotide arrays. Nature Med. 2: 753–759.

Lashkari, D.A., DeRisi, J.L., McCusker, J.H., Namath, A.F., Gentile, C., Hwang, S.Y., Brown, P.O., and Davis, R.W. (1997). Yeast microarrays for genome wide parallel genetic and gene expression analysis. Proc. Natl. Acad. Sci. USA 94: 13057–13062.

Lemieux, B., Aharoni, A., and M. Schena (1998). Overview of DNA Chip Technology. Molecular Breeding 4, 277–289.

Lockhart, D. J., Dong, H., Byrne, M. C. , Follettie, M. T. , Gallo, M. V. , Chee, M. S., Mittmann, M., Wang C., Kobayashi, M., Horton, H., Brown, E. L. (1996) Expression Monitoring by Hybridization to High–Density Oligonucleotide Arrays. Nature Biotechnology 14: 1675–1680.

Maier, E., Meier–Ewert, S., Ahmadi, A. R., Curtis, J., Lehrach, H. (1994) Application of robotic technology to automated sequence fingerprint analysis by oligonucleotide hybridisation. Summary.

Pease, A. C., Solas, D., Sullivan, E. J., Cronin, M. T., Holmes, C. P., Fodor, S. P. A. (1994) Light–generated oligonucleotide arrays for rapid DNA sequence analysis. Proc. Natl. Acad. Sci. USA 91: 5022–5026.

Sapolsky, R. J., Lipshutz, R. J. (1996) Mapping Genomic Library Clones Using Oligonucleotide Arrays. Genomics 33: 445–456.

Schena, M., Shalon, D., Davis, R. W., Brown, P. O. (1995) Quantitative monitoring of gene expression patterns with a complementary DNA microarray. Science 270 :467–470.

Schena, M. (1996) Genome Analysis with Gene Expression Microarrays. BioEssays 18: 427–431.

Schena, M., Shalon, D., Heller, R., Chai, A., Brown, P. O., Davis, R. W. (1996) Parallel human genome analysis: microarray–based expression montitoring of 1000 gene. Proc Natl Acad Sci USA 93: 10614–10619.

Schena, M., Heller, R.A., Theriault, T.P., Konrad, K., Lachenmeier, E., Davis, R.W. (1998) Microarrays: Biotechnology's discovery platform for functional genomics. Trends Biotech. 16, 301–306.

Schena, M. and Davis, R.W. (1998) Parallel Analysis with Biological Chips. in PCR Methods Manual, Academic Press (San Diego), in press.

Shalon, D., Smith, S. J., Brown, P. O. (1996). A DNA micro–array system for analyzing complex DNA samples using two–color fluorescent probe hybridization. Genome Research 6: 639–645.

Shoemaker, D. D., Lashkari, D. A., Morris, D., Mittmann, M., Davis, R. W. (1996) Quantitative phenotypic analysis of yeast deletion mutants using a highly parallel molecular bar–coding strategy. Nature Genetics 14: 450–456.

Wodicka, L., Dong, H., Mittmann, M., Ho, M.–H. and Lockhart, D.J. (1997) Genome–wide expression monitoring in *Saccharomyces cerevisiae. Nature Biotech.* 15, 1359–1367.

Yershov, G., Barsky, V., Belgovsky, A., Kirillov, E., Kreindlin, E., Ivanov, I., Parinov, S., Guschin, D., Drobishev, A., Dubliley, S., Mirzabekov, A. (1996) DNA analysis and diagnostics on oligonucleotide microchips. Proc. Natl. Acad. Sci. USA 93: 4913–4918.

Maier, et al., "Application of robotic technology to automated sequence fingerprint analysis by oligonucleotide hybridisation", Journal of Biotechnolog 35, pp. 191–203, 1994.

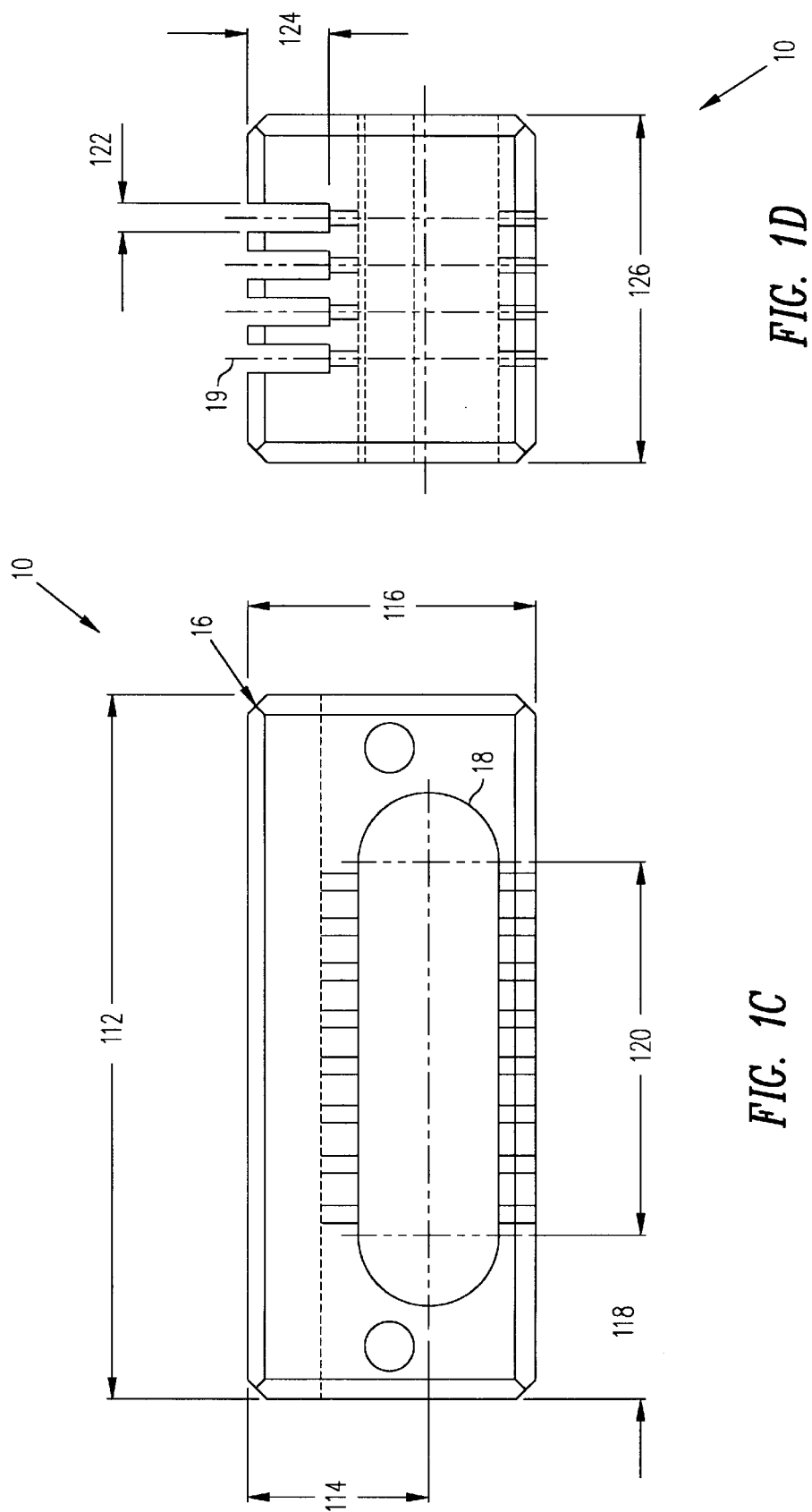

MICROARRAY PRINTING DEVICE INCLUDING PRINTING PINS WITH FLAT TIPS AND EXTERIOR CHANNEL AND METHOD OF MANUFACTURE

RELATED APPLICATIONS

This is a continuation of Provisional patent 70014 U.S. PTO 60/066,733 filed on Nov. 21, 1997 with the title "ChipMaker".

FIELD OF THE INVENTION

This invention relates to a specialized device for printing microarrays of biochemical substances.

BACKGROUND

Microarrays of biochemical substances have been used extensively for biological analysis as is well known in the art. The ability to manufacture microarrays in an efficient and cost-effective manner is of considerable interest to researchers worldwide and of significant commercial value. Various types of microarray manufacturing devices and technologies have been described previously. Each of these approaches has certain deficiencies that are addressed by the present invention.

Combinatorial array approaches, such as described by Southern et al. (U.S. Pat. Nos. 5,770,367, 5,700,637, and 5,436,327), Pirrung et al. (U.S. Pat. No. 5,143,854), Fodor et al. (U.S. Pat. Nos. 5,744,305 and 5,800,992), and Winkler et al. (U.S. Pat. No. 5,384,261), have been used with success in cases in which polymers of short sequences are required. The combinatorial approaches generate significant biological and chemical diversity but are unable to construct microarrays of large macromolecules. The combinatorial technologies can also be expensive and difficult to implement.

Ink-jetting and other "drop-on-demand" devices also permit the fabrication of biological and chemical arrays as shown by Brennan (U.S. Pat. No. 5,474,796), Tisone (U.S. Pat. No. 5,741,554), and Hayes et al. (U.S. Pat. No. 5,658,802). These non-contact technologies are deficient due to their inability to array large numbers of samples easily and to control the quality of the resultant microarrays.

A third category of arraying devices work by direct surface contact printing as described by Augenlicht (U.S. Pat. No. 4,981,783), Drmanac et al. (U.S. Pat. No. 5,525,464), Roach et al. (U.S. Pat. No. 5,770,151), and Brown et al. (U.S. Pat. No. 5,807,522). Each of these technologies has been successful but is less robust than the device of the present invention. Deficiencies of the earlier technologies include imprecise sample uptake and delivery as well as lack of durability.

The present invention describes a novel device that allows the rapid and cost-effective manufacture of microarrays of biochemical substances. The device is made with advanced machining technologies such as an electronic discharge machine (EDM), thereby providing for precise sample uptake and delivery. The device is suitable for use in a basic research or a commercial production environment and can be attached to a motion control system that allows precise three-dimensional movements.

SUMMARY

The present invention is used to manufacture microarrays of biochemical samples by direct contact printing. In one embodiment, a device for printing microarrays is provided. The device comprises a holder and one or more printing pins. Each printing pin has a sample channel for a predetermined volume of liquid, a flat tip, and a collar that prevents rotation of the tip in the holder. The points of the pins are formed with an electronic discharge machine (EDM), a process that ensures uniformity of the pins and of the resultant printed elements of the microarray. The device may be attached to a motion control system for automated movement of the device in three dimensions.

The holder accommodates up to 32 pins, allowing for rapid printing of many samples. The pins travel in the holder without the use of springs which reduces wear on the tips and increases durability of the device. Rectangular collars prevent rotation of the pins in the holder during the printing process which provides a highly regular printed array. Samples may be withdrawn from microplates and may include largely pure collections of biochemical substances. Printing substrates may include one or more microscope slides or solid glass wafers. In one preferred embodiment, the device is used to manufacture a microarray of nucleic acids or derivatives thereof.

The present invention is used to manufacture microarrays of biochemical samples by direct contact printing. In one embodiment, a device for printing microarrays is provided. The device comprises a holder and one or more printing pins. Each printing pin has a sample channel for a predetermined volume of liquid, a flat tip, and a collar that prevents rotation of the tip in the holder.

The holder accommodates up to 32 pins, allowing for rapid printing of many samples. The pins travel in the holder without the use of springs which reduces wear on the tips and increases durability of the device. The rectangular collars prevent rotation of the pins in the holder during the printing process which provides a highly regular printed array. Printing substrates may include one or more microscope slides or solid glass wafers.

A method for making a printing pin is also provided. A centerless shaft is ground to a designated outer diameter. Then the outer surfaces of the point of the pin are defined. A sample channel is cut, thereby creating a gap between the two halves of the point of the pin. Next, a rectangular collar is formed and attached to the non-printing end of the shaft. Finally, the width of the gap between the two halves of the point of the pin is adjusted, and a squared-off, flat tip at the printing end of the pin is formed.

In one embodiment of the present invention, the points of the pins are formed with an electronic discharge machine (EDM) to ensure uniformity of the pins and of the resultant printed elements of the microarray. In another embodiment, EDM is used to cut the sample channel. In another embodiment of the present invention, the device is used to manufacture a microarray of nucleic acids or derivatives thereof. In still another embodiment, the device is attached to a motion control system for automated movement of the device in three dimensions.

BRIEF DESCRIPTION OF THE DRAWINGS

FIG. 1C shows a rear view of the holder.

FIG. 1D shows a side view of the holder.

DETAILED DESCRIPTION

A. The Holder

The holder 10 or print head, shown from various viewpoints in FIGS. 1A–1E, is machined from brass or some other rigid substance using standard machining procedures. Brass was chosen for its durability and smooth surface properties which make it favorable as a guiding surface. Metals, alloys, ceramics, plastic composites and other materials would likely suffice as alternate materials to brass to provide a rigid holder.

The most critical tolerance is that of the apertures 14 or bushings which locate each pin. The diameter of each aperture 14 should be 0.0615"±0.0002 and care must be taken to make sure that this outer diameter is maintained and satisfied for each of the apertures 14. Note that carbide reamers and other drilling devices exhibit minor wear with prolonged use, which will effectively reduce the final diameter of the aperture 14. Reamers and other drilling devices should be replaced as needed to maintain the tolerances. Bushing apertures 14 can be checked on the finished holder 10 by confirming that a pin made to the 0.0610" specification described below travels freely but snugly in the holder 10.

Figure 6:
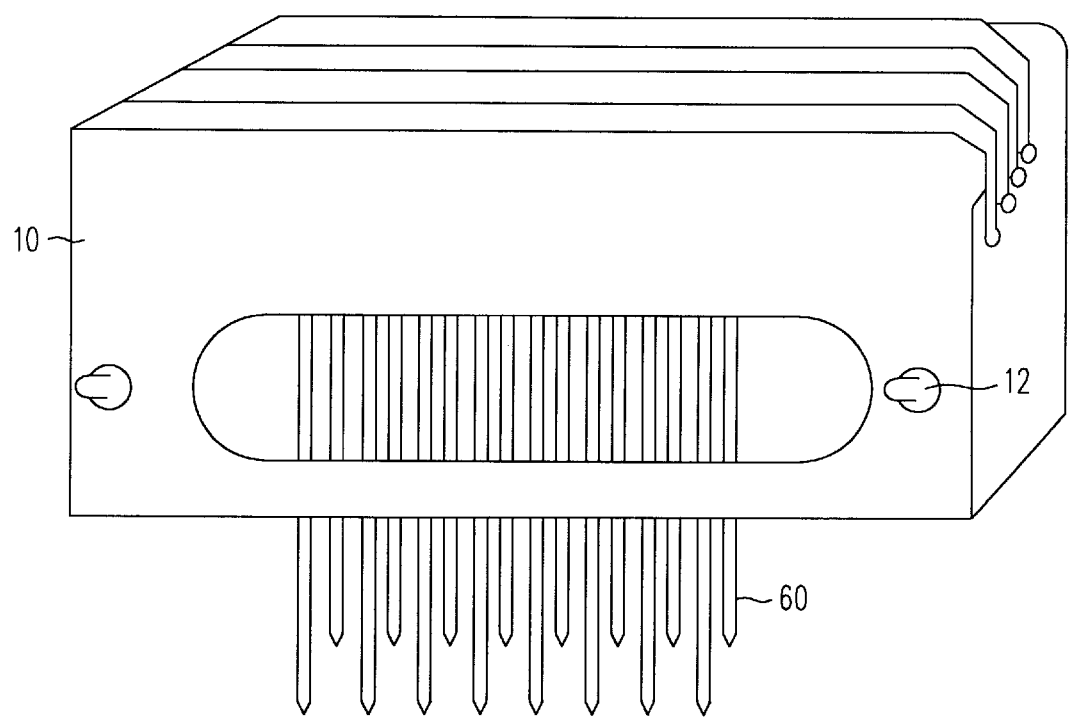
FIG. 6 shows a holder with 16 pins configured for microarray printing.

FIG. 6 shows pins 60 in a holder 10. However, the number and spacing of pins 60 contained in the holder 10 is variable. A holder 10 of this type may be operated with up to 32 pins 60. Additionally, holders of greater numbers of pins up to 128 could be envisioned and are in various stages of development. A holder with 128 pins might be used to uptake samples from a microplate containing 1,536 sample wells.

Other types of holders would suffice to locate the pins during printing. For example, a holder that provides only a single guiding surface for each pin, instead of two guiding surfaces as provided in the holder 10 depicted in FIGS. 1A–1E is possible. A holder of the single guiding surface type would have the approximate dimensions 2.5"×1.25"×0.5" instead of 2.5"×1.25"×1.0", which are the dimensions labeled as elements 112, 126, and 116, respectively, of holder 10 shown in FIG. 1E.

The process of making the holder is as follows:

Bar stock 1.5"×1"×12' in length is cut to a length of 2.6". While holding the 1.5" dimension in a vise with jaws 0.200" deep, the top of the part is fly cut with a 2.0" diameter fly cutter. The width 112, length 116, and corners 16 (45°) are then profiled at 1.0" depth with a ½" end mill, and a 0.06" chamfer is profiled on the top of the part with a ¼"–90° counter sink as shown in FIG. 1C. Note cut out 18 with its rounded ends of radius 0.25". Dimensions 114, 118, and 120 are 0.63", 0.56", and 1.38", respectively.

The part is flipped over and held at the 1.25" dimension. Excess material is removed with a ¾" rough end mill laving 0.01" material. The part is fly cut to a 1.0" finish thickness. A 0.06" chamfer is then profiled on the bottom of the part with a ¾"–90° counter sink.

Figure 1A:
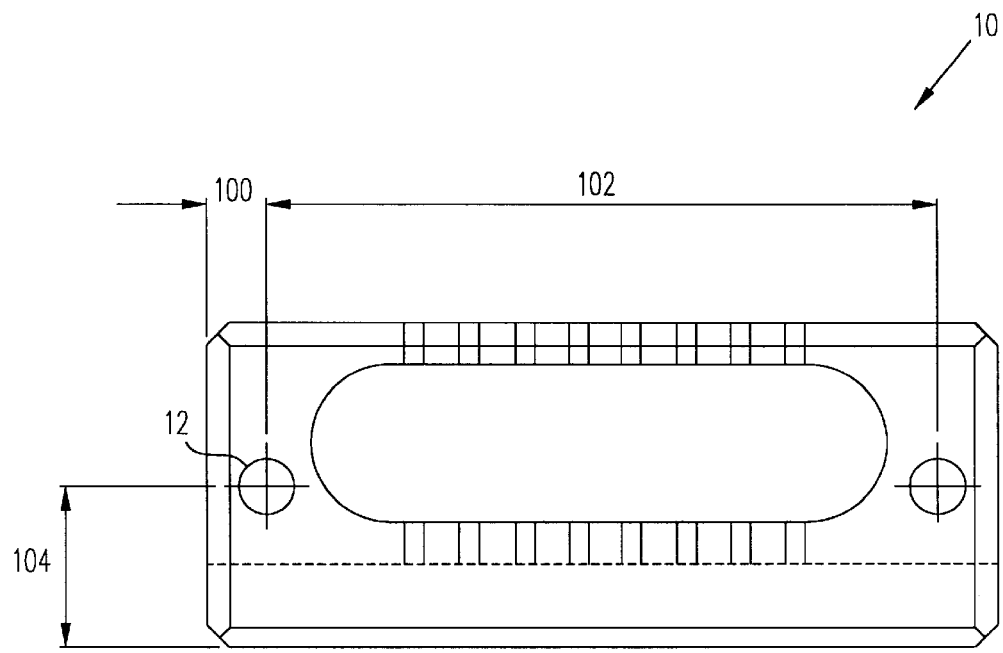
FIG. 1A shows an upside-down, rear view of the holder.
Figure 1B:
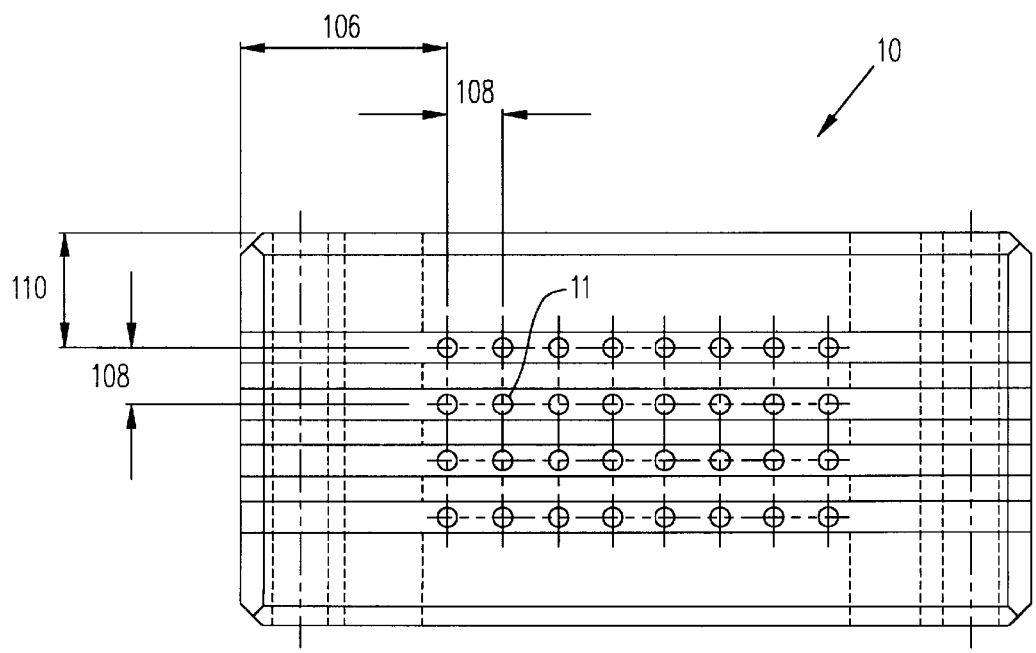
FIG. 1B shows a top view of the holder.

Holding on to the 1.0" dimension, a ¼"–90° counter sink is used to spot drill two tapped holes. A #17 drill and a #10–32 roll tap are employed to drill and tap the two holes. A 7/16" drill and a ⅜" end mill are then used to make a ½" slot. FIG. 1A shows the orientation of the resulting two mounting holes 12. Note that the center of each of the mounting holes 12 is at a distance 100 of 0.188" from the side edge of the holder 10 and at a distance 104 of 0.5" from the top and bottom edges of the holder 10. The distance 102 between the centers of the two mounting holes 12 is 2.125".

Figure 1E:
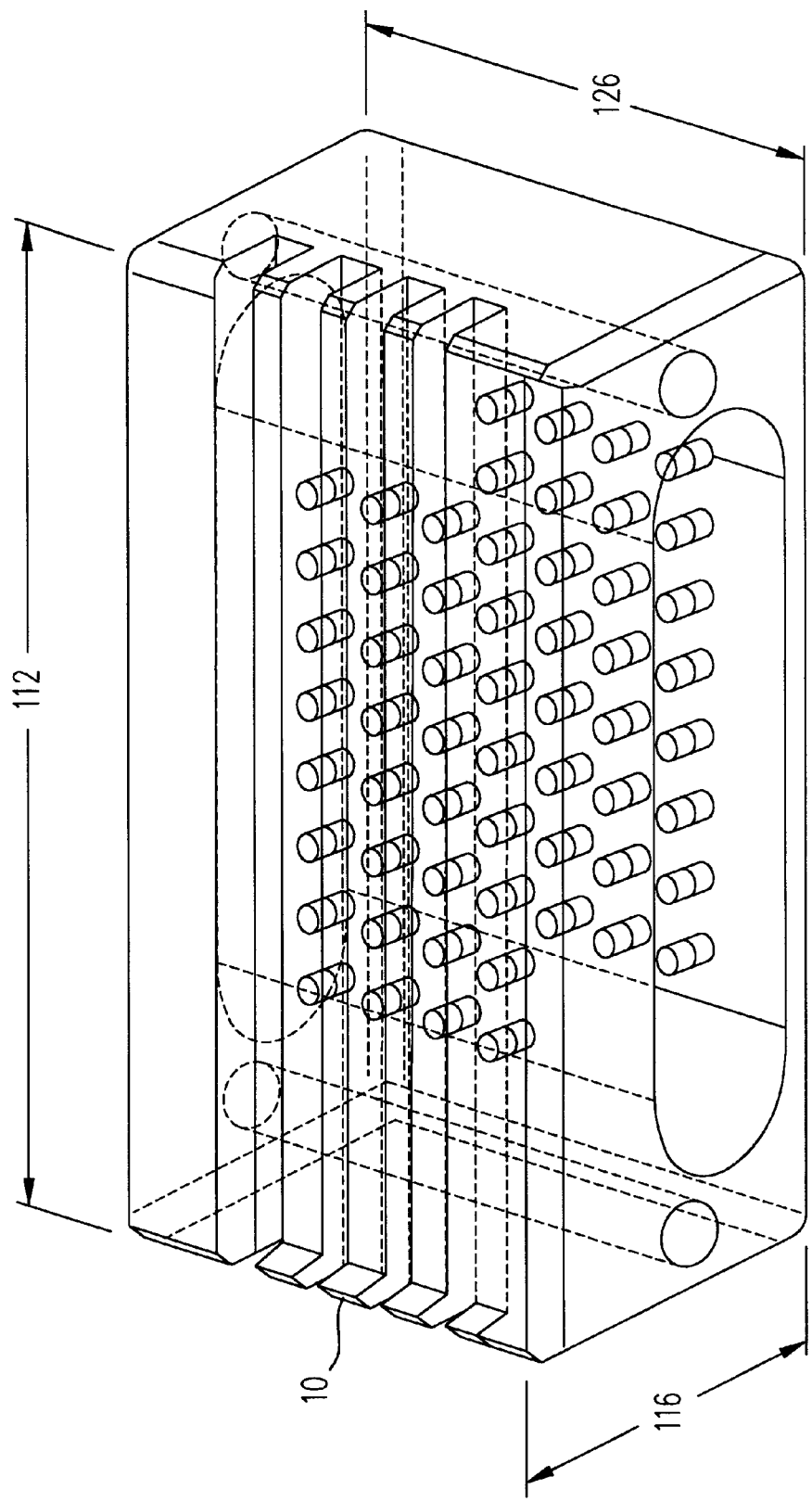
FIG. 1E shows a three-dimensional view of the holder.

Holding on to the 1.25" dimension, thirty two 0.615" holes are spot drilled with a ¼"–90° counter sink. A #54 drill is used to drill the thirty two holes, and a 0.615" reamer is utilized to ream the thirty two holes of 0.615" diameter. Note the thirty two apertures 14 in FIG. 1B. The distance 108 between the apertures 14 is 0.177". The distance 106 between the nearest row of apertures 12 and the side edges of the holder 10 is 0.63" and the distance 110 between the nearest row of apertures 14 and the front and back edges of the holder 10 is 0.36". Referring to FIG. 1D, a 3/32" end mill is used to cut four slots 19 each of 0.106" width 122 and of 0.250" depth 124. Finally, the part is deburred, sanded, polished, and cleaned to yield the completed holder 10 as shown in FIG. 1E.

B. The Printing Pins

FIGS. 2A–2D and 3A–3B illustrate a printing pin. The pin is comprised of two parts: the shaft 28 and the collar 24. The shaft 28 is made out of 440-C stainless steel. Series 400 stainless is preferable to softer grades of stainless steel, such as series 300 materials which tend to be less durable than series 400 materials. Located on the lower, printing end of the shaft 28 is the point 20 of the pin. The point 20 of the pin is magnified in FIG. 3B to reveal a flat tip 32 and a sample channel 22. Referring again to FIG. 3A, the collar 24 is made out of 303 stainless steel and is located at the upper, non-printing end of the shaft 28.

Pin shafts 28 are centerless ground from 1.75" lengths 216 of 1/16" stock 440-C stainless steel for a final outer diameter 212 of 0.0610" with a tolerance of 0.0003". Precision in printing requires that the dimensions of the pin shaft 28 are met with precision. Additional printing precision can be obtained by screening the centerless ground material to select pieces that are several tenths oversized with respect to the 0.0610" specification. Outer diameters 212 are measured with standard commercial micrometers such as those made by Mitutoyo. Depending on the precision of the centerless grinding, it may be necessary to discard undersized stock.

Figure 2A:
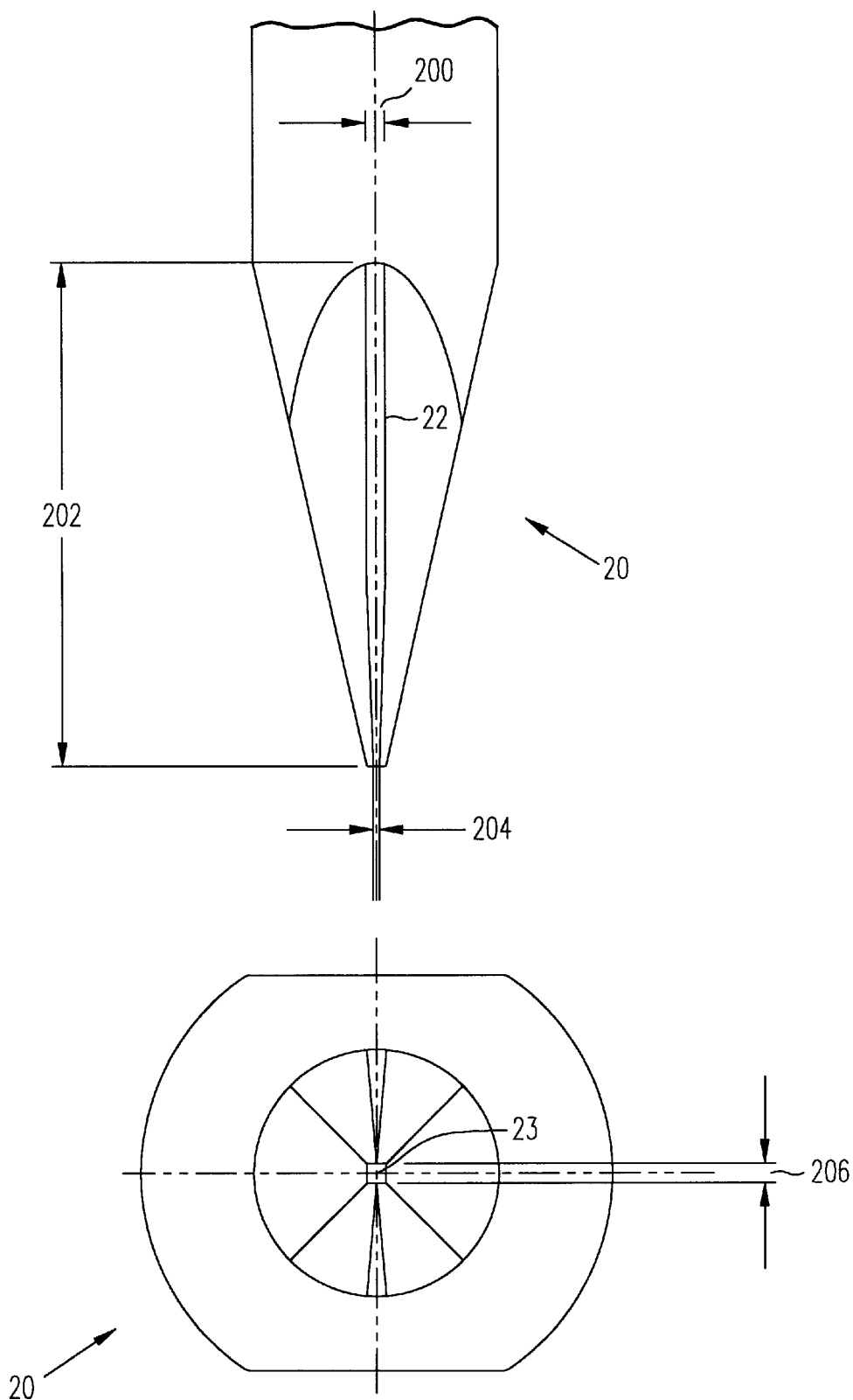
FIG. 2A shows the dimensions of the point of a printing pin.
Figure 4:
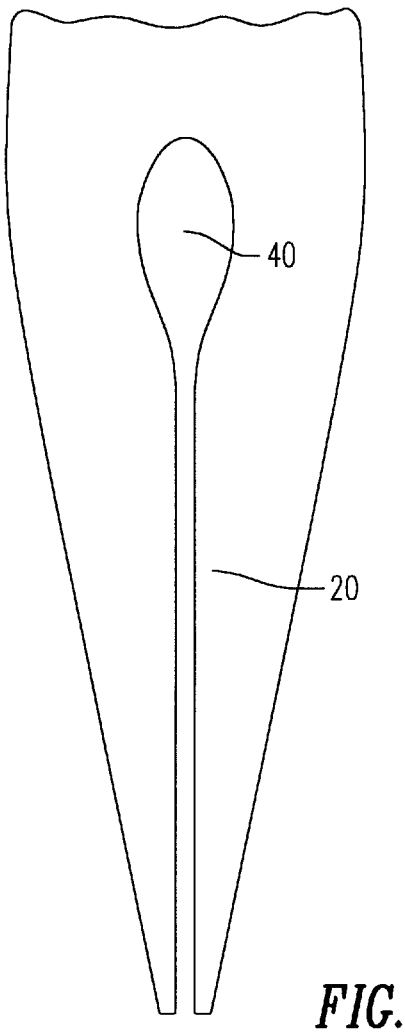
FIG. 4 is a magnified depiction of the point of a printing pin having an expanded sample channel.

Pin shafts 28 that meet the tolerances are then machined with a wire electronic discharge machine (EDM) to define the point 20 of the pin and the sample channel 22, shown in FIG. 2A. The outer surfaces of the point are machined with four separate EDM cutting steps. Care must be taken to ensure that the apex 23 of the four cuts forms a point in the geometric center of the pin shaft 28. The point 20, for example, may have a dimension 206 of 0.0040" (tolerance of –0.0005") square. The EDM is then used to cut the sample channel 22 to a depth 202. Thus, as illustrated in FIG. 2A, the sample channel is cut from one side of point 20 to the other and is, consequently, an exterior sample channel. The sample channel may have a depth, for example, may be 0.125" and a width 200 of 0.004"±0.002". The width of the wire and the extent of bending (described below) determines the volume of the sample channel 22. For example, a 4 mil (0.004") EDM wire that makes a cut 0.125" deep into the pin shaft 28 provides a sample channel 22 with a volume of 0.2 μl after bending. Larger wires and different cutting routines can be used to prepare custom sample channels such as those with an expanded sample reservoir as depicted in FIG. 4.

In other embodiments of the present invention, points defined by EDM are subjected to alternate cutting technologies to form the sample channel 22. Stainless steel saw blades and possibly lasers can be used to form the sample channel 22. The important criteria of the sample channel 22 include a smooth and regular surface and a predefined volume, both of which are readily accomplished with EDM but could also be accomplished by other means.

Referring again to FIG. 2B, the rectangular collars 24 are installed onto the non-printing end of each pin by gently pressing the collar 24 into place. The collars 24 are machined to a height 214 of 0.25" and a diameter 208 of 0.120" and a radius 210 of the curvature for the corners of 0.015". The tolerances of the collars 24 are critical in that undersized material can result in a flaring of the pin shaft 28 at the point of attachment of the collar 24. The outer diameter 212 of the pin shaft 28 should be measured with a micrometer to confirm that this dimension does not exceed 0.0613" after the collars 24 are pressed into place. Pins that are flared at the collar attachment point beyond 0.0613" will not travel freely in the holder because each aperture in the holder is 0.0615".

Figure 3A:
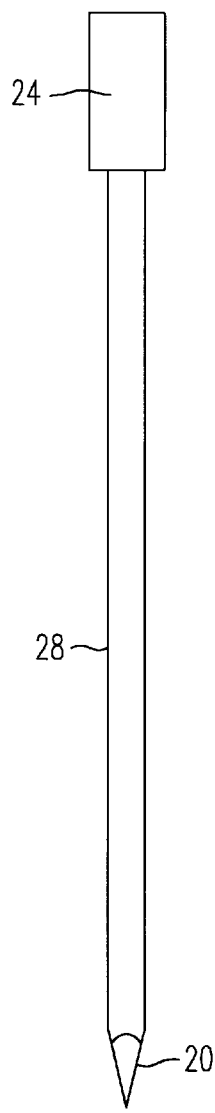
Figure 3B:
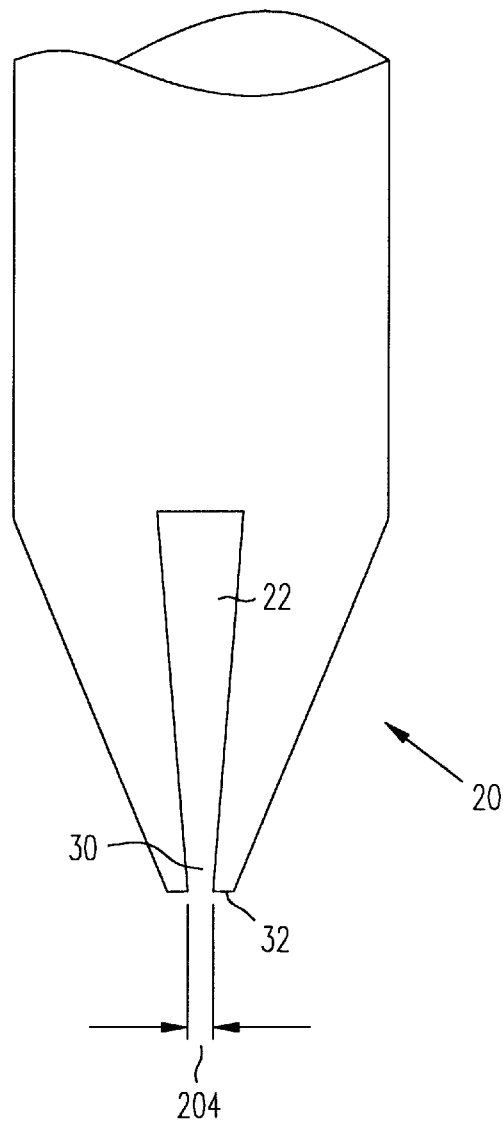
FIG. 3B is a magnified depiction of the point of a printing pin.

Following the four EDM cuts to define the point, the additional cut used to prepare the sample channel, and the attachment of the collar, the gap 30 at the tip of the pin that defines the sample channel 22, as shown in FIG. 3B, must be brought into closer proximity to provide optimal sample uptake and printing. A 4 mil wire will result in a sample channel 22 with an approximate width 200 of 4 mil. Bending of the points is accomplished by applying uniform pressure on opposing points approximately 0.1" from the end of the points 20. Applied pressure should be sufficient to move the opposing points to within several tenths (0.0003") of touching to allow relaxation of the points after the pressure is released. The gap 30 at the end of sample channel 22 after relaxation should be adjusted such that the two halves of the square pyramid form a gap 30 with a final width 204 of 0.0008–0.0010". Very sharp corners are required on the functional end of the pin. Wire EDM cuts without creating burrs and leaves all the perpendicular edges sharp to less than 0.0002". This creates a flat, squared-off tip 32 as shown in FIG. 3B. If other grades of stainless are used, point bending will have to be made empirically to determine the forces required to form sample channels properly.

Figure 2B:
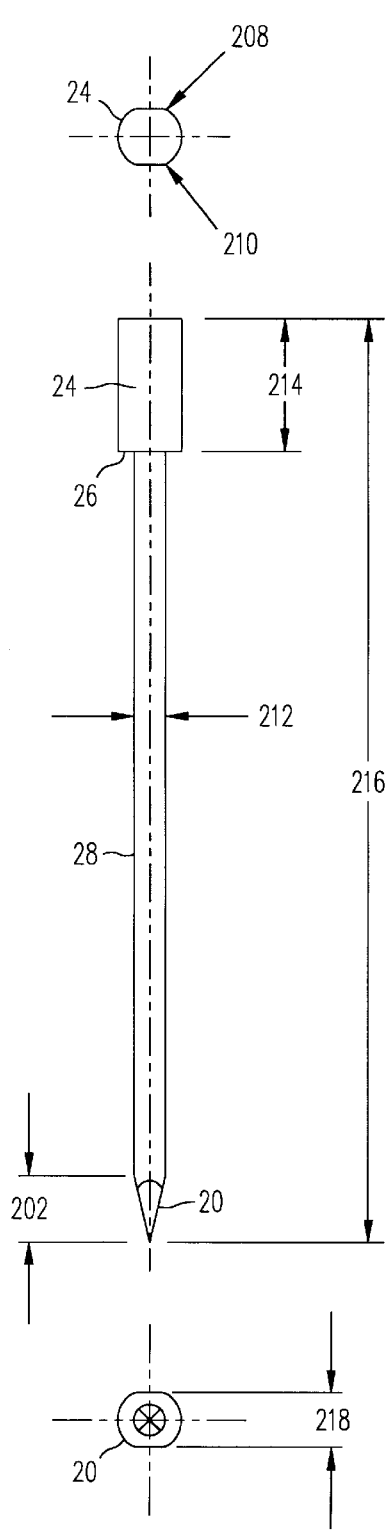
FIG. 2B shows the dimensions of a printing pin.
Figure 2C:
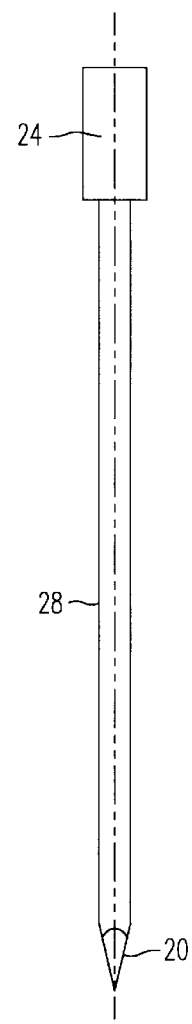
FIGS. 2C–2D and 3A are simplified illustrations of a printing pin.
Figure 2D:
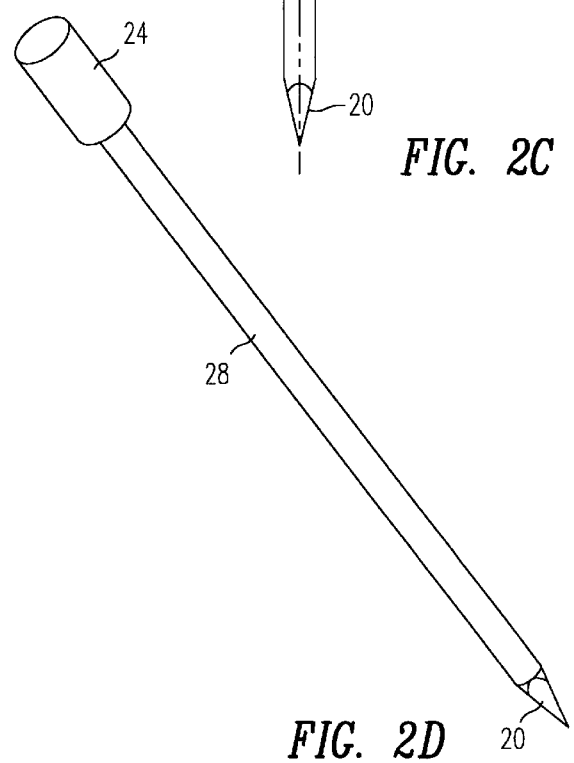

The process for making a printing pin is as follows:

The initial operations required to make the pin are best understood with reference to FIG. 2B. The collar 24 is made on a cnc lathe holding ±0.001" tolerance on length, ±0.0001" tolerance on the internal bore. All edges are broken 0.002". The outer diameter is held in the range of 0.250–0.252" diameter. Finishes of 16 $\mu$in or better on all surfaces are required.

The shaft 28 is centerless ground from larger stock to ±0.0001" of designated diameter 212 of 0.0610" and to a 16–20 $\mu$in finish. The shaft diameter 212 is left oversized to allow for polishing to final dimension. A clearance of 0.0005–0.0007" is allowed between the guide block and the pin after final polishing. Straightness and surface finish of the shaft 28 is critical. Manual polishing of the shaft 28 to 12 $\mu$in is required to reduce friction in the guide block (holder 10). Polishing is done along the axis of the shaft 28 while being rotated giving the shaft 28 a multi-faceted surface texture. Construction of the pin to this point uses standard machining practices.

The shaft 28 is mounted so that the first angular cuts may be taken utilizing wire EDM. The angles and the sample channel 22 are cut and then the shaft 28 is rotated 90 degrees to complete the two remaining angled sides. While being held in position, wire EDM is again used to cut the shaft 28 to final length.

Referring again to FIG. 2B, the collar 24 is pressed onto the shaft 28 with enough force to prevent separation, but with as little force as possible to avoid increasing the diameter of the shaft 28 just under the head where the pressing forces are the greatest. Sizing here is critical. Press is usually in the range of 0.0001–0.00015". Less than this and the two parts are in danger of separation; more than this and the press will damage the shaft 28. No adhesives are used so as to avoid contamination.

Anti-rotation flats are then provided on the upper guide. Wire EDM is employed to cut these flats, making sure there are no projecting burrs or contamination. Cutting is done with a fixed orientation in respect to the sample channel 22 in the end of the pin. After this EDM operation, the flats are polished to 12 $\mu$in or better. The pin is then cleaned to remove dust which would otherwise hamper the adjustment of the pin gap at 100×.

The adjustment of the pin gap 30, shown in FIG. 3B, employs high precision tooling to hold the pin firmly and without damaging or marking, and a high precision optical comparitor with 20 $\mu$in resolution readout. The pin is placed in the fixture, oriented radially in alignment with the beam on the comparitor at 20×, and clamped without marking the pin. The pin must be held in radial and axial alignment during the adjusting. After clamping, the comparitor is switched to 100× to resolve the intended gap of 0.0008–0.0010". Fingers being driven in by screws from the sides of the fixture press against the angled surfaces of the pin at a precise location near the top of the channel 22, called the sweet spot. Missing this spot results either in spring back with no permanent deformation of the pin or in damage to the pin with no permanent deformation at the pin tip 32.

Figure 5:
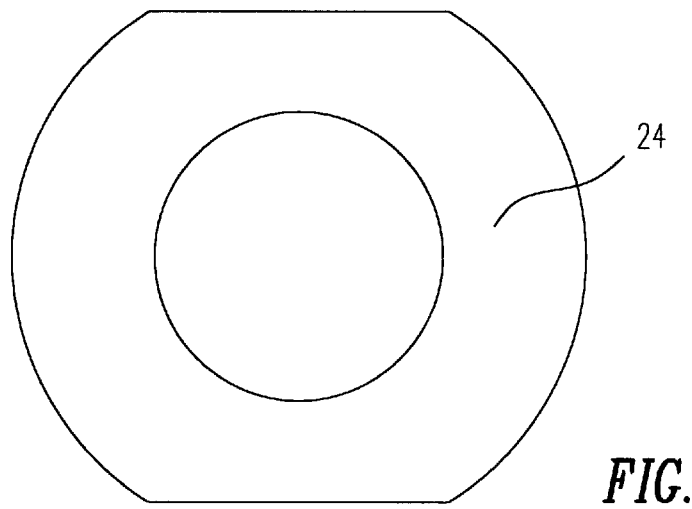
FIG. 5 shows a rectangular collar.

Other variations will suffice to provide operational printing pins. In other embodiments, pins of different diameters, lengths and sample channel configurations will provide high quality microarrays. The key technical consideration is the use of collars instead of springs, which reduces the impact forces on the pin points by one or more orders of magnitude. A rectangular collar is shown in FIG. 5. Additional reductions in point forces could be achieved by reducing the weight of the pin and collar.

Another embodiment of the present invention employs custom sample channels that can be modified to hold sample volumes up to 1.0–2.0 microliters (1.0–2.0×10$^{-6}$ liter). The capacity to use EDM to adjust the predefined volume of sample loaded allows the user to dictate the number of microarrays produced from a single loading. A typical pin, depicted in FIGS. 2A–2D, 3A, and 3B, will deposit approximately 1.0 nanoliter (1.0×10$^{-9}$ liter) of biochemical sample, providing for approximately 200 microarrays for a sample channel 22 that holds 0.2 microliters (0.2×10$^{-6}$ liter). Larger sample channels that contain an expanded sample reservoir 40, as shown in FIG. 4, would allow as many as 1,000 microarrays to be produced from a single loading.

Other embodiments of the present invention allow for larger printing points that deliver up to 10 nanoliters (10× 10$^{-9}$ liter) of biochemical substance. This is accomplished by altering the EDM cutting routine used to make the points. A point that has square outer dimensions of 3 mil×3 mil (0.003"×0.003") will produce a circular microarray element that is approximately 4 mil (0.004") in diameter. A point that has square outer dimensions of 8 mil×8 mil (0.008"×0.008") will produce a circular microarray element that is approximately 10 mil (0.010") in diameter.

C. Cleaning the Holder and Pins Prior to Use

Following their manufacture, it is important to clean the holder and pins thoroughly prior to use. Cleaning removes grease, oils, particulate and other contaminants that impair the proper function of the holder and pins. The pins can be cleaned by sonication in a bath containing ArrayIt™ Micro-Cleaning Solution (TeleChem) or another suitable detergent for 5 minutes. The major ingredients of Micro-Cleaning solution are: Water (7732-18-5); Glycine, N,N'-1,2-ethanediylbis (N-(carboxymethyl-, tetrasodium salt 964-02-8); Benzenesulfonic acid, dimethyl-, ammonium salt (26447-10-9); Benzenesulfonic acid, dodecyl-cpd with 2,2', 2"-nitrilotrix(ethanol (27323-41-7); Poly(oxy-1,2-ethanediyl); alpha(undecyl)-omegahydroxy (34398-01-1). Other commercial liquid detergents work also.

Following a 5 minute sonication step, the pins are extensively rinsed with distilled water and dried with forced air. During sonication, the holder and pins must never come in direct contact with the sonicator. Direct contact between the holder or pins and the sonicator can lead to permanent damage. The pins should never be left in microcleaning solution for longer than 10 minutes. Storing the holder and pins in Micro-Cleaning Solution for periods in excess of 10 min can lead to permanent damage.

Following normal use, pins can be sonicated in distilled water to remove residual sample. Plastic or rubber gloves should be worn at all times while handling the holder and pins. Hand oils can impair the function of the pins and lead to corrosion of the holder. The brass holder can be cleaned and polished using common commercially available brass cleaning products.

D. Printing Microarrays

In a preferred embodiment, the holder is attached to a motion control system capable of automated three-dimensional movement. This is accomplished by mounting the holder onto a gantry or other suitable device using the two threaded mounting holes 12 located on the back of the holder 10 as shown in FIG. 1A. The holder should be attached firmly to the motion control system, but care should be taken not to tighten the mounting bolts excessively. Finger tightening with a hand wrench should provide sufficient mounting stability.

Once the holder is mounted in place, each pin is inserted into an aperture in the holder until the bottom surface of the collar comes into resting contact with the upper surface of the holder. Properly installed pins in the resting position should be flush with the top of the holder and extend below the bottom surface of the holder by 0.75". Care must be taken that each pin rides correctly in both the upper and lower bushing in the holder. Pins should travel freely in the holder without any detectable ceasing. Free travel can be tested by gently lifting each mounted pin upward with a forceps. Pins that move freely should return to the full resting position without downward force. Newly mounted pins may partially seize in the holder. In most cases, new pins that seize partially can be made to travel freely in the holder by moving the pin up and down in the holder manually with a forceps for 20–30 cycles. This conditioning step removes tiny burrs in the bushing or pin shaft that prevent free travel of the pin.

Once the holder and pins are mounted, the device can be used for microarray manufacture in an automated fashion. The basic printing cycle follows a generic routine consisting of three steps: sample loading, sample printing, and sample removal.

As microarray experiments depend upon the quality of the samples, PCR products purified with one of the ARRAYIT™ PCR purification systems are used for DNA printing. Samples prepared by other purification procedures may contain trace contaminants that can clog the pins.

Sample loading is accomplished by submerging the point of the pins into a sample. In a preferred embodiment, a robot controls the movement of the printing device along the Z axis. Samples can be stored and retrieved conveniently from microplates or any other reagent tray that provides a thin layer of sample to the sample loading channel. In a preferred embodiment, samples are stored in microplates containing 384 individual wells, spaced at 0.45 cm intervals. In this configuration, the printing device described herein can uptake 32 samples from 32 wells configured in a 4×8 pattern. Individual wells containing 10 microliters ($10 \times 10^{-6}$ liter) or less work well for loading. Volumes exceeding 10 microliters may result in excess sample adhering to the outside of the printing point, resulting in irregular sample transfer to the printing surface.

Once the points of the pins are immersed in the sample, a loading time of several seconds is usually sufficient. One important feature of the invention is that the sample fills the sample channel. This provides for precise and predetermined sample loading volumes that depend only on the volume of the sample channel of the pin. This is not provided by earlier devices and technologies that use capillaries, tweezers and other pronged devices and in which the sample forms a meniscus upon loading.

The present invention allows for other variations of sample loading to be used. The holder and pins can be moved manually for sample loading. The pins can also be used manually without the use of the holder. Manual sample uptake and delivery provides a means for microarray preparation in cases where an automated motion control system is not available.

Once the sample is loaded so as to fill the sample channel, the pins are brought into proximity of the printing substrate. In a preferred embodiment, this movement is performed in an automated manner using a computer-controlled robot. Once the loaded pins are moved over the printing substrate, printing is accomplished by direct contact between the printing pin and the surface. The total contact time required for printing is approximately 0.05 seconds. The dwell time can be adjusted to provide larger or smaller volumes of delivered sample. In a preferred embodiment, the printing surface is a multitude of microscope slides, though the present invention allows for one or more printings on many different types of surfaces. Care must be taken not to drag the pins across the solid surface, as this may result in permanent damage to the points.

When the pins contact the surface, they travel freely in the holder. The absence of springs greatly reduces the forces on the printing point, allowing for more rapid and durable printing.

Once the sample is printed on the substrate, the holder and pins may be moved to additional locations for additional printing steps. The pin shown in FIGS. 2A–2D will produce approximately 200 printed microarray elements from a single sample loading. Multiple printing steps can be performed on the same substrate or on adjacent substrates.

The quality of the resultant microarrays depends on the printing surface and the buffer in which the samples are contained. The device herein has been used to print on silylated microscopes slides purchased from CEL Associates (Houston, Tex.). A buffer that works well in conjunction with the silylated microscope slides is a 1× concentration of Micro-Spotting Solution (TeleChem), which is a mixture of polymers and charged components. The device will also work well with biochemical compounds such as nucleic acids dissolved in standard buffers such as SSC and SSPE, which are available from a variety of vendors including Sigma. However, extremes in temperature or pH as well as the use of strong solvents may damage the pin's surface chemistry.

The resultant microarrays can be detected by instruments made by General Scanning, Molecular Dynamics and others.

After each location is printed, it is sometimes preferable to remove residual sample from the sample channel. This prevents the previous sample from contaminating successive samples in cases in which multiple printing cycles are employed. The wash step can be accomplished in a variety of ways. In a preferred embodiment, the holder and pins are moved to a wash station that typically contains a source of wash solution and a source of vacuum or forced air. The points of the pins are immersed in wash solution such as distilled water or 10% ethanol, then the wash solution is removed from the sample channel by drying. Generally, three such wash and dry cycles are required to remove the residual sample from the sample channel such that contamination of the following sample is less than 10 ppm (part per million). The brass holder can be cleaned and polished using common commercially available brass cleaning products. Plastic or rubber gloves should be worn at all times while handling the holder and pins, as hand oils can impair the function of the pins and lead to corrosion of the holder.

Other wash and dry regimes work well. A simple routine employs a circulating source of distilled water and a source of vacuum such as that from any of a variety of commercial laboratory vacuum pumps. The pins can be moved back and forth between the wash and dry stations manually or with a computer-controlled motion system. An effective dry station might have an aperture for each pin of approximate diameter 0.071" and a chamber to allow the insertion of the points of the pins. The final wash step should result in pin sample channels that are free of the residual sample and wash buffer, and sample channels should be completely dry for the next round of sample loading.

The holder and pins can then be used to uptake and deliver additional samples. In a preferred embodiment, the holder and pins are used in hundreds or thousands of cycles to build a microarray of the desired complexity. A holder and one or more printing pins can be used for 1 million cycles per pin without appreciable loss of performance.

Some general parameters for use of the present invention with a computer-controlled motion system are suggested below. All motion control parameters are suggestions only, and each of these parameters should be empirically tested with a single pin to test printing quality and pin durability. Parameters can be modified to maximize printing quality and speed in a manner compatible with the motion control system used. However, changes in Z axis surface clearance, acceleration, velocity and travel should be made with extreme care.

Figure 7:
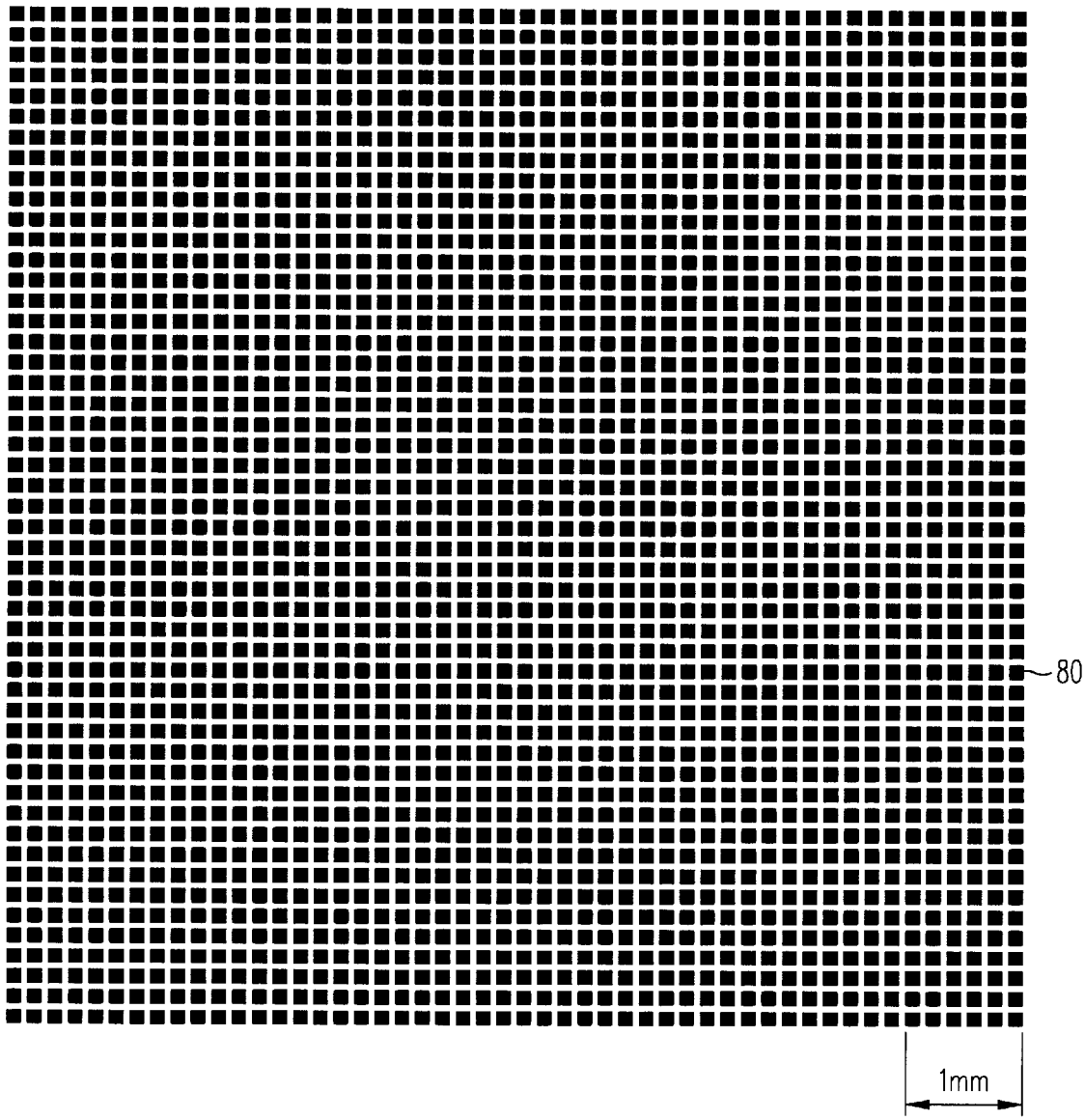
FIG. 7 is a printed microarray of a biochemical sample.

Non-surface contact: X, Y, Z motions permissible
Surface contact: Z only
Sample loading time: 2–3 sec
Pin wash time: 3 cycles at 1–3 sec/cycle
Pin dry time: 3 cycles at 1–3 sec/cycle
Z axis surface clearance: 0.125 inches
Z axis acceleration: 30 cm/sec$^2$
Z axis velocity: 2 cm/sec
Z axis travel (surface=0): +0.0625 inches
Surface dwell time: 0.05 sec
Printing cycle time (32 pins): 32 features/sec Additional specifications that may assist in the use of the present invention are provided below for a standard holder and pins:
Customizable 32 pin print head (1 to 32 pins)
100–150 $\mu$m feature size (depending on sample and substrate)
Printing precision of ±15 microns
Speed: 32 features per second
1.8×3.6 cm printing size grid w/32 pins
Uptake volume of 0.20 $\mu$l
Delivery volume of 1.0 nanoliter (depending on sample and substrate)
Versatility: Can use either 96 or 384 well plate format
High-throughput: 50 microarrays of 25,000 features in <12 hrs
25,000 features in a 1.8×3.6 cm area
Attaches to existing robotic machines and motion control systems In one embodiment of the present invention, a microarray of nucleic acids or nucleic acid derivatives is prepared as shown in FIG. 7. A holder and a single pin were used to uptake and deposit 1 nanoliter quantities of the fluorescent nucleotide analog Cy3-dCTP (Amersham) diluted to a concentration of 1 micromolar ($1\times10^{-6}$ molar). A single loading was used to print 50 adjacent microarray elements 80 at a center-to-center spacing of 200 microns (0.008") in a straight row. After printing the first 50 elements 80, the pin was washed, dried, reloaded and used to print a second row of 50 elements 80. A repeated series of such steps resulted in a microarray of 50×50 elements 80 for 2,500 total elements 80 in an area of 1 cm$^2$. Automated motion control was mediated with a PixSys 5500 robot from Cartesian Technologies (Irvine, Calif.). Fluorescence detection was made by means of a ScanArray 3000 confocal scanning device by General Scanning (Watertown, Mass.).

What is claimed is:

1. A device for printing microarrays comprising:

a holder; and one or more printing pins that are mounted in said holder, each of said one or more printing pins having an exterior sample channel for holding a predetermined volume of a sample and a flat tip.

2. The device of claim 1 wherein said holder accommodates up to 32 pins.

3. The device of claim 1 wherein each of said one or more printing pins has a collar to prevent rotation of said one or more printing pins in said holder.

4. The device of claim 3 wherein said one or more printing pins is movably mounted in said holder, said one or more printing pins being movable in a vertical direction, said one or more printing pins having a rest position wherein a bottom surface of said collar contacts said holder stopping the downward movement of said one or more printing pins.

5. A method of making a printing pin comprising:

providing a pin shaft;

producing a point having a flat tip at a first end of said pin shaft; and producing an exterior sample channel at said point of said pin shaft, thereby creating a gap at said point.

6. The method of claim 5 further comprising:

forming a collar; and attaching said collar to the second end of said pin shaft.

7. The method of claim 5 further comprising adjusting the width of said gap at said point.

8. The method of claim 5 wherein said producing a point comprises forming four angular sides on said first end of said pin shaft, said four angular sides having an apex that forms a square flat tip in the approximate geometric center of said pin shaft.

9. The method of claim 8 wherein said forming four angular sides comprises cutting with an electronic discharge machine (EDM).

10. The method of claim 5 wherein said producing an exterior sample channel comprises cutting with an electronic discharge machine (EDM).

* * * * *